(12) United States Patent
Cullen et al.

(10) Patent No.: US 9,018,805 B2
(45) Date of Patent: Apr. 28, 2015

(54) SUPERCONDUCTING MACHINES

(75) Inventors: John J. A. Cullen, Derby (GB); David S. Knott, Loughborough (GB)

(73) Assignee: Rolls-Royce PLC, London (GB)

( * ) Notice: Subject to any disclaimer, the term of this patent is extended or adjusted under 35 U.S.C. 154(b) by 343 days.

(21) Appl. No.: 13/426,073

(22) Filed: Mar. 21, 2012

(65) Prior Publication Data

US 2012/0248903 A1  Oct. 4, 2012

(30) Foreign Application Priority Data

Mar. 31, 2011 (GB) .................................. 1105404.6

(51) Int. Cl.
*H02K 55/00* (2006.01)
*H02K 55/04* (2006.01)
*H02K 3/51* (2006.01)
*H02K 3/38* (2006.01)
(Continued)

(52) U.S. Cl.
CPC .................. *H02K 55/04* (2013.01); *H02K 3/51* (2013.01); *H02K 3/38* (2013.01); *H02K 3/50* (2013.01); *H02K 55/00* (2013.01); *H02K 9/10* (2013.01); *H02K 9/14* (2013.01); *H02K 9/19* (2013.01)

(58) Field of Classification Search
CPC ............. H02K 3/38; H02K 3/50; H02K 3/51; H02K 3/505; H02K 9/10; H02K 9/14; H02K 9/19; H02K 55/00; H02K 55/04; H02K 1/32
USPC .......... 310/52, 54, 58, 59, 60 A, 60 R, 61, 64, 310/65, 260, 270, 114, 266
See application file for complete search history.

(56) References Cited

U.S. PATENT DOCUMENTS 4,082,967 A * 4/1978 Laskaris .......................... 310/64
4,297,603 A * 10/1981 Weghaupt ....................... 310/53
(Continued)

FOREIGN PATENT DOCUMENTS

EP   1 672 300 A1   6/2006
JP   A-60-158608   8/1985
(Continued)

OTHER PUBLICATIONS

Taneda et al. (JP 2-252214 A) (Oct. 11, 1990) English Translation.*
(Continued)

*Primary Examiner* — Quyen Leung
*Assistant Examiner* — Robert E Mates
(74) *Attorney, Agent, or Firm* — Oliff PLC

(57) ABSTRACT

A machine such as a ship's engine has a superconducting component requiring cooling for its operation, and includes a cooling system. The cooling system is operable in first and second modes. In a cool-down phase the cooling system is run in the first mode providing relatively high heat transfer from the superconducting component. On attainment of a desired operating temperature the cooling system is run in the second mode, providing lower heat transfer. This enables a reduced cool-down time of the machine, while allowing economical operation in normal service. The higher level of cooling in the first mode used during the start-up procedure can involve a colder cryogen, or a greater flow of coolant. One way of achieving the latter is to circulate the coolant in normally evacuated regions during the cool-down phase, and then re-establishing the vacuum in these regions for normal service operation.

4 Claims, 3 Drawing Sheets

(51) Int. Cl.
*H02K 3/50* (2006.01)
*H02K 9/10* (2006.01)
*H02K 9/14* (2006.01)
*H02K 9/19* (2006.01)

(56) References Cited

U.S. PATENT DOCUMENTS

| | | | |
|---|---|---|---|
| 6,415,613 | B1 | 7/2002 | Ackermann et al. |
| 7,531,924 | B2 * | 5/2009 | Kwon et al. ............ 310/52 |
| 7,548,000 | B2 * | 6/2009 | Urbahn et al. ............ 310/54 |
| 2010/0113282 | A1 | 5/2010 | Kawashima |

FOREIGN PATENT DOCUMENTS

| | | |
|---|---|---|
| JP | A-61-125002 | 6/1986 |
| JP | A-62-89305 | 4/1987 |
| JP | 01055056 A * | 3/1989 |
| JP | A-2-252214 | 10/1990 |
| JP | 04285463 A * | 10/1992 |

OTHER PUBLICATIONS

Sato et al. (JP 04285463 A)(Oct. 9, 1992) English Translation.*
Kobayashi et al. (JP 01055056 A) English Abstract.*
British Search Report dated Jul. 22, 2011 issued in British Patent Application No. 1105404.6.

* cited by examiner

Section A-A

SUPERCONDUCTING MACHINES

BACKGROUND

This invention relates to superconducting machines, and more particularly to such a machine having a cooling system and to a method of operating such a machine.

Superconducting electrical machines require a cryogenic cooling system to keep at least one of their major components (i.e. the rotor or the stator) at cryogenic temperatures suited to the superconducting state. Thus the cryogenic system allows at least one of the electrical machine's windings (i.e. on the stator and/or on the rotor) to operate in the superconducting state. The cryogenic system is usually sized to remove the steady-state heat load (i.e. the heat leaking into the cryogenically cooled region from warmer regions) from the superconducting major component, usually the rotor.

Superconducting electrical machines of large power and low speed (e.g. of the order of a few megawatts running at up to a few hundred r.p.m.) such as are used in marine propulsion are physically large and have large thermal mass. In consequence the superconducting machine takes a long time to cool down from ambient to the temperature required for the superconducting state. This cool-down period is of the order of days in machines rated as above.

Compared to a conventional (i.e. non-superconducting) electrical machine, the long cool-down period represents a commercial disadvantage which works against the widespread adoption of large superconducting machines by the market. This arises because the superconducting electrical machine cannot be used until its relevant major component has been cooled to the required cryogenic temperature, but it is uneconomic to keep it cooled permanently.

Simple analysis shows that the time to cool down a body of mass M, initially at temperature Thot and subsequently at temperature T after time t, is given by equation 1:—

$$t(T)=((M \cdot S)/(h \cdot A)) \cdot \ln[(T\text{hot}-T\text{cool})/(T-T\text{cool})] \qquad \text{Equation 1.}$$

where 'ln' is the logarithm to the base 'e', S is the specific heat of the body, A is the area of the body that is exposed to the coolant, h is the heat transfer coefficient (assumed constant) from the body to the coolant, and Tcool is the temperature (assumed constant) of the coolant. This formula shows that the cool-down period (t) is reduced if the surface area of the body exposed to the coolant is increased and/or the heat transfer coefficient is increased. Similarly, the cool-down period is reduced if the temperature of the coolant (Tcool) is reduced.

The above formula can be recast in dimensionless form as:—

$$h \cdot A \cdot t(T)/(M \cdot S)=\ln[[(T\text{hot}-T\text{cool})/(T-T\text{cool})] \qquad \text{Equation 2.}$$

If initial temperature Thot=300K (i.e. approx. room temperature), Tcool=20K and the target temperature T=25K. Then the equation gives ln(280/5)=4.03 approximately.

If the coolant temperature is reduced so that Tcool=4.2K (i.e. liquid-helium temperature) then ln(295.8/20.8)=2.66 approx. which represents a (time) saving of about one third (1−2.66/4.03). However, a colder coolant is obviously more expensive.

In general terms, for maximum cooling it is desirable (i) to increase the body area (A) which is exposed to the coolant, (ii) to increase the heat transfer coefficient (h) from the body to the coolant, and (iii) to reduce the coolant temperature (Tcool), but all these measures are likely to involve increased expense.

SUMMARY

According to the invention there is provided a method and apparatus as provided by the appended claims.

In one aspect there is a provided a method of operating a superconducting rotary electrical machine comprising a two-part rotor having an inner part and an outer part, both parts configured to receive a flow of coolant and the inner part including at least one superconducting component (15) requiring cooling for its operation; and, a cooling system configurable to provide coolant to the two-part rotor in a first mode and a second mode, the method comprising: during cool-down of the superconducting component, operating the cooling system in the first mode in which the cooling system is configured to provide coolant to the outer rotor and inner rotor; and during operation of the machine once the superconducting component has attained a predetermined temperature, operating the cooling system in the second mode in which the cooling system is configured to provide coolant to the inner rotor only.

The change from the first mode to the second mode may be achieved by changing the total flow rate of a coolant.

The outer rotor may be evacuated so as to be under vacuum during the second mode.

The outer rotor may include an inner region and an outer region separated by a radiation screen, the radiation screen providing flow paths for coolant, the method further comprising the steps of: providing a flow of coolant through the inner and outer regions during the first mode.

The temperature of the coolant may differ between the first mode and the second mode.

A different or additional coolant may be used in the first mode relative to that used in the second mode.

The said predetermined temperature may be higher than a steady-state temperature of the component during operation of the machine.

In a second aspect the invention provides a superconducting rotary electrical machine, comprising: a two-part rotor having an inner part and an outer part configured to receive a flow of coolant, the inner part including at least one superconducting component requiring cooling for its operation; and, a cooling system configurable to provide coolant to the two-part rotor in a first mode and a second mode, wherein during the first mode the cooling system is configured to provide coolant to the first chamber and second chamber, and during the second mode the cooling system is configured to provide coolant to the first chamber only such the heat transfer from the superconducting component is higher in the first mode than in the second mode.

The cooling system may be adapted to change between the first and second modes by changing the total flow rate of the coolant.

The outer rotor may be a vacuum chamber configured to be under vacuum during operation of the cooling system in the second mode.

The inner rotor may include a rotary shaft having a chamber for receiving a flow of coolant in the first mode.

The outer rotor may further comprise a radiation screen which partitions so as to provide an inner region and an outer region, the inner and outer regions providing fluid paths for a flow of coolant.

The inner region and outer region may be in fluid communication via an opening in the radiation screen.

The openings may include a cover portion which substantially obstructs the openings from a radial direction.

The covers may be integrally formed with the shield.

In another aspect there is provided a method of operating a machine having a superconducting component requiring cooling for its operation and including a cooling system, the method comprising:

a) during cool-down of the superconducting component, operating the cooling system in a first mode in which the cooling system provides relatively high heat transfer from the component; and b) during operation of the machine once the superconducting component has attained a predetermined temperature, operating the cooling system in a second mode in which the cooling system provides relatively low heat transfer from the component.

The mode of operation of the cooling system can be changed by changing the speed of circulation of the coolant, or changing its temperature, or by circulating the coolant in additional regions during cooling, where it does not circulate during operation; a further option is to use a different or additional coolant for the cool-down phase. Combinations of these possibilities can be used. In one embodiment, the coolant is circulated during cool-down (in addition to circulation in the normal operational region) in regions that during normal service operation are under vacuum.

Another aspect of the present invention provides a machine having a superconducting component requiring cooling for its operation and including a cooling system, in which the cooling system is operable in first and second modes, in which the heat transfer from the superconducting component is higher in the first mode than in the second mode.

In this specification, "normal service operation" and similar terms refer to operation of the machine for normal functional purposes, when the superconducting component is at a substantially steady-state temperature in which superconducting operation can proceed. For example, if the machine is a superconducting motor for a ship or other watercraft, normal service operation is operation of the motor to drive the vessel.

BRIEF DESCRIPTION OF THE DRAWINGS

For a better understanding of the invention, embodiments will now be explained with reference to the attached drawings, in which.

DETAILED DESCRIPTION OF EMBODIMENTS

An example will be explained in relation to an electrical machine's rotor, as it is the rotor which is usually the major component that carries the superconducting winding. It will be understood, however, that the same principles can be applied to a superconducting stator winding (or indeed both, in the case where stator and rotor carry superconducting windings).

Figure 1:
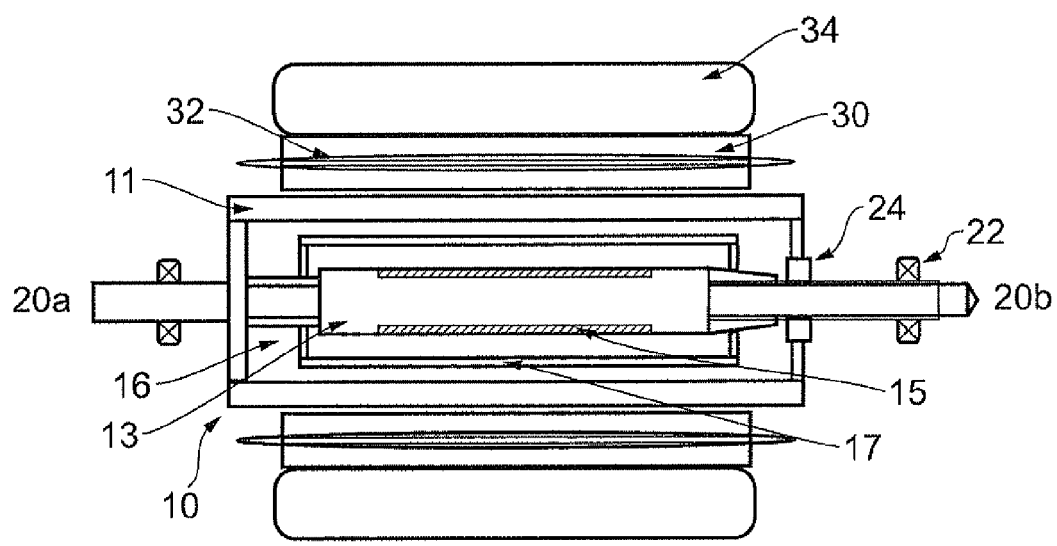
FIG. 1 shows a typical layout for a cryogenically cooled superconducting motor.

FIG. 1 (not to scale) shows the key components of a typical wound-field superconducting machine 1 having a two-part rotor 10 with inner rotor 13 and outer rotor 11. The inner rotor 13 is driven by, or drives, a shaft 20 mounted on bearings 22, the drive end being indicated as 20a. A superconducting field winding 15 surrounds the inner rotor and is cooled by a cooling system which in the embodiment described is a cryogenic system. The inner rotor carrying the superconducting winding 15 is fed with cryogen along the axis. In order to reduce the ingress of heat to the superconductor, known as heat in-leak, the inner rotor 13 is surrounded by a region 16 which is maintained under vacuum. As a further measure to keep the rotor cold, a cylindrical radiation screen 17 located within the vacuum space surrounds the inner rotor 13. Seals 24 provide a hermetic seal between the outer rotor 11 and the shaft 20.

The DC current supply and the cryogenic fluid supply to the rotor along the machine's axis from the non-drive end 20b are not shown.

Figure 2:
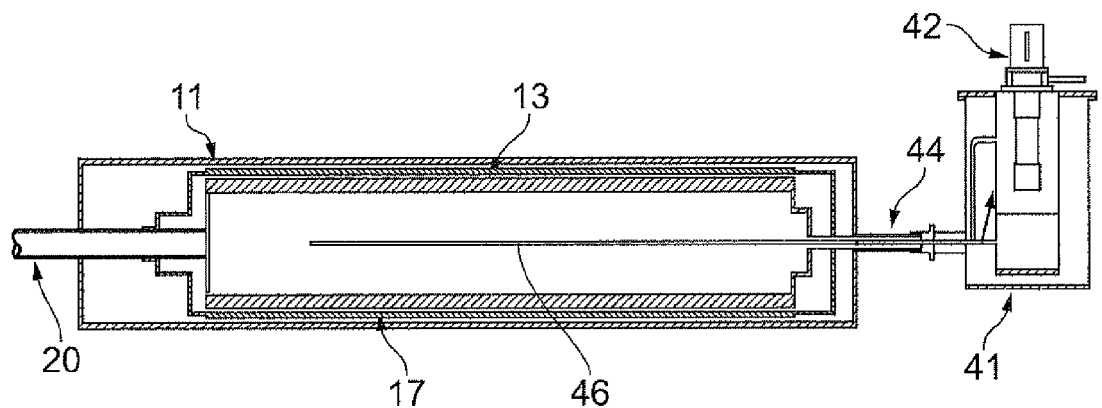
FIG. 2 shows a detail of the cooled rotor.

The cryogenic system of the machine is operable in first and second modes, as will be described below FIG. 2 is a diagram (also not to scale) of a typical rotor system fed with cryogen along the axis, showing the cryogenic system 40 operating in the second mode during normal service operation of the machine. The cryogenic system 40 comprises a cryostat 41 in which a cooler 42 is mounted. Coolant passes to the interior of the inner rotor 13 via a lance 46.

It takes a long time to cool such a system from ambient temperature to the very low temperatures required to enable superconducting operation. The invention addresses this problem by providing a cryogenic system that can run in the first mode at a higher rating for cooling-down purposes, before actual operation of the machine, during which the cryogenic system runs in the second mode at a "steady-state rating". Examples of such systems will now be described.

In one type of embodiment of the invention there are two such cryogenic supplies, and in many cases their circulation path is the same during cool-down as during steady-state operation. Such a novel cryogenic system is shown schematically in FIG. 3, where V1 is a valve which directs cryogen from either or both cryogen supplies to the axis of the superconducting rotor via a line 46, which may be a lance as in the known configurations. V1 also has a closed position such that no cryogen can flow to the rotor from either supply. The cryogen supply for the steady state is shown at Css, and an additional supply of cryogen used specifically to reduce the cool-down period is shown at Ccd.

Note that the pumps to drive the cryogen(s) around the cooling circuit are not shown. Again, superconducting-rotor types are envisaged, but not exclusively.

Cryogen in the cool-down supply Ccd can be either:—

(a) the same cryogen as used in the steady-state supply Css, in which case the two supplies (Css and Ccd) feed the rotor together so as to increase the flow of cryogen to the rotor and thereby increase the rate at which the latent heat of vaporization can be used by the rotor body in order to cool down. This amounts to increasing the heat transfer coefficient (h) of the cryogen—see equation 1; or (b) a different and colder cryogen than that in Css. In this case only the colder cryogen Ccd is used during cool-down and, being colder than that in Css, it reduces the cool-down period as explained above.

In a variant of (a) there is only one cryogen supply, but the corresponding pump is run at a higher power during cool-down, giving rise to a faster circulation and hence increased heat transfer.

In those cases where there are one or more vacuum spaces within the superconducting machine, that are normally maintained in the evacuated state by continuous vacuum pumping, the vacuum can be relaxed during the cool-down period by correct operation of the valves, so as to allow access by the cool-down cryogenic fluid to the designated vacuum space(s). This also shortens the cool-down period.

Figure 4:
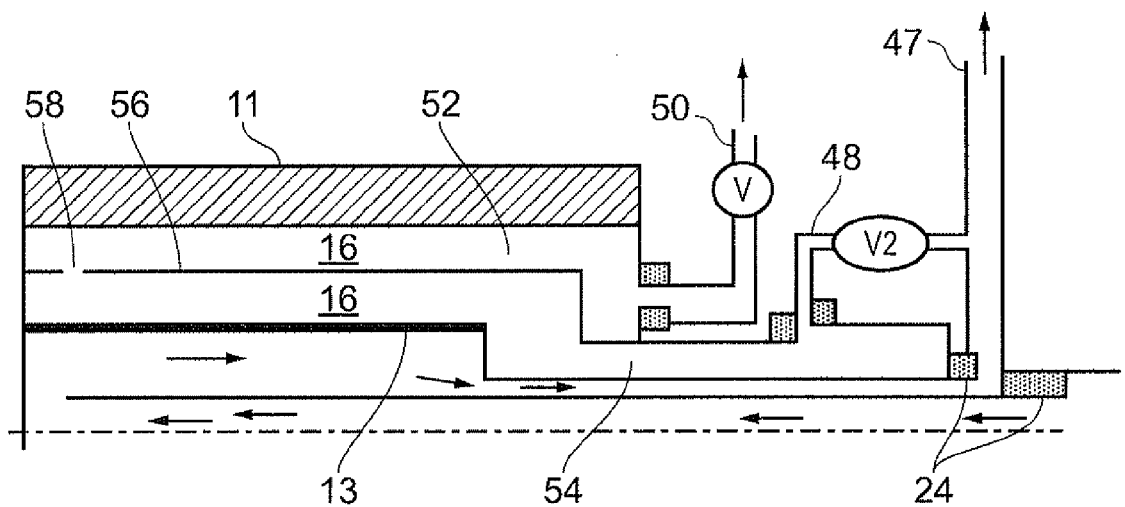
FIG. 4 is a schematic of the corresponding cryogen feed and vacuum systems.

A setup of this kind is shown in FIG. 4. This diagram shows a partial section through the system. The region 16, normally under vacuum, comprises an outer region 52 and an inner region 54, which are separated by a radiation screen 56. The regions 52 and 54 communicate with each other through an opening 58 in the radiation screen 56. A return line 47 for cryogen is connected by a branch line 48 to the inner region 54. A vacuum line valve V is shown, on the pump side of the branch line connection, as is a valve V2 on the branch line 48.

In the first mode of operation, during cool-down, the vacuum line valve V is closed and, while the cryogen is flowing through the inner rotor, as indicated by arrows, and returning to the cryogen supply via the valve V1 (FIG. 3) along the return line 47, the branch line valve V2 is opened. Cryogen is then drawn into the vacuum spaces 16 under the residual vacuum in them, so providing an enhanced cooling effect on the inner and outer rotors 11, 13 as a whole.

The possibility of passing coolant via the branch valve V2 into the vacuum space 16 in the initial cool-down phase exposes more of the surface area of the rotors 11, 13 to the cryogenic coolant and thereby reduces the cool-down period in accordance with equation 1. Here there need only be one supply of cryogen, but two may be used, as shown in FIG. 3, in which case either supply Ccd or Css, or both, can be admitted to the vacuum spaces 16.

Figure 3:
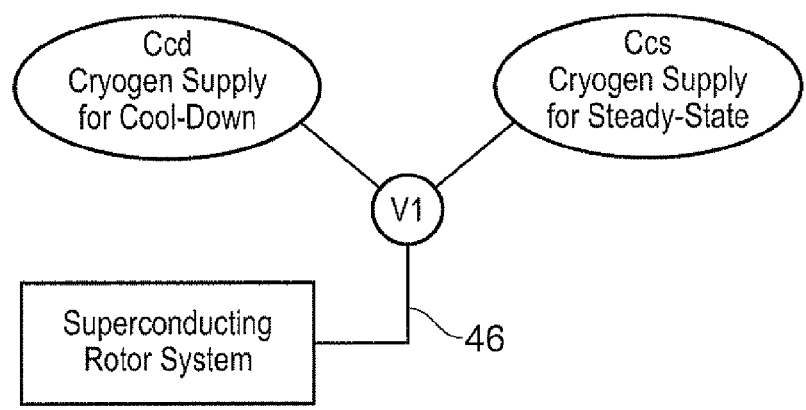
FIG. 3 shows a flow chart of the cooling system of an embodiment of the invention.

Once cool-down has been achieved, the following actions are then performed:—
(a) The valve V1 in FIG. 3 is closed so that the supply of cryogen to the rotor is terminated.
(b) The valve V is opened and the vacuum pump then starts to remove the cool-down cryogen from the rotor system via the vacuum line 50, thereby ultimately re-creating a vacuum as required for steady-state operation.
(c) The valve V2 between the cryogen return line 47 and the vacuum spaces 16 is closed as soon as possible thereafter, thereby recreating the vacuum space.
(d) The valve V1 (FIG. 3) is opened to allow cryogen to flow to the inner rotor 13 for steady-state operation, i.e. the second mode of operation of the cryogen system.

In another embodiment, cool down is achieved using an iron lung approach whereby the vacuum spaces are flooded with coolant and V2 is closed while vacuum pump removes the coolant via valve V. Once a substantial portion of the coolant has been removed, V can be closed and V2 reopened to admit more coolant. This cycle can be repeated until sufficient cool down has been achieved. The iron lung approach would be preferable if minimising the number of pipes connecting with the vacuum space is desirable to simplify sealing arrangements.

In some circumstances, the rotors 11, 13 are not cooled down in the first mode of operation completely to the desired target temperature T. This is because heat may be transferred to the region of the superconducting winding 15 by conduction and convection through the cool-down cryogen occupying the spaces 16 in which a vacuum is established during steady-state operation. Hence, the point at which the vacuum pump starts to re-establish a vacuum in the regions 16 is at a temperature (Thi) which is slightly higher than the target temperature T. The final cool-down to temperature T is then achieved using the steady-state cryogen in Css.

The temperature Thi will be chosen so as to optimise the cooling process, taking account of:
i) heat in-leak by conduction axially along the rotor (see FIG. 1) while the vacuum is being restored (step (b) above), i.e. when no cryogen is being fed to the rotors 11, 13; and
ii) heat in-leak by convection to the inner rotor 13 (see FIGS. 1, 2 and 4) while the vacuum in the vacuum space is being restored in step (b) above to the correct level for steady-state operation.

The present invention thus provides a higher heat transfer during cool-down than during steady-state operation by using a colder cryogenic coolant and/or by increasing the quantity of cryogenic coolant that is used. The increased quantity is achieved by increasing the flow rate of the cryogen, and/or or by drawing from an additional supply and/or by flooding more of the electrical machine with cryogen than occurs during steady-state operation. Heat transfer is increased by increasing the heat transfer coefficient to the cryogen from the body of the electrical machine or, in the case of the flooding of additional regions of the machine, by increasing the area of surface exposed to the cryogen. Embodiments of the invention can thus make maximum use of the existing cooling and electrical machine systems with minimal additional equipment.

The present invention can be applied to superconducting machines with a superconducting rotor, or where both the stator and the rotor carry superconducting windings.

The process described with reference to FIG. 4 requires the connection of both a vacuum pump and the cryogen circuit to the regions 16, and this is more easily effected where the rotor winding (rather than the stator winding) is superconducting and so needs to be cooled.

The radiation shield helps shield the superconducting inner rotor from thermal radiation, particularly radiation emitted from the outer rotor. The radiation shield is a generally cylindrical member and is made from at least two layers. The first layer is a radially outer cylindrical member which provides mechanical support for the second, radially inner, layer which would otherwise deform under the centrifugal forces experienced during operation of the machine. The first layer may be made from any suitable material but is typically a stainless steel such as 316 grade with a suitably finished outer surface to minimise the radiant heat absorbed from the outer rotor.

The inner layer is also generally cylindrical and made from a material having a high thermal conductivity, such as copper. The copper layer may be anisotropic in that it has a higher thermal conductivity in one direction, for example in the axial direction of the machine, so that radiant heat can be captured and diverted away from the superconducting inner rotor elements to the cooling system at the ends of the machine. The heat can be removed from the ends of the machine by using, for example, coolant in a counter-flow cooled torque tube.

It will be appreciated that the radiation screen can be dimensioned to suit a particular design and make of machine. In one example, for a several MW machine, the inner layer may be between 3 mm and 8 mm, and the outer layer may be between 7 mm and 13 mm.

Figure 5A:
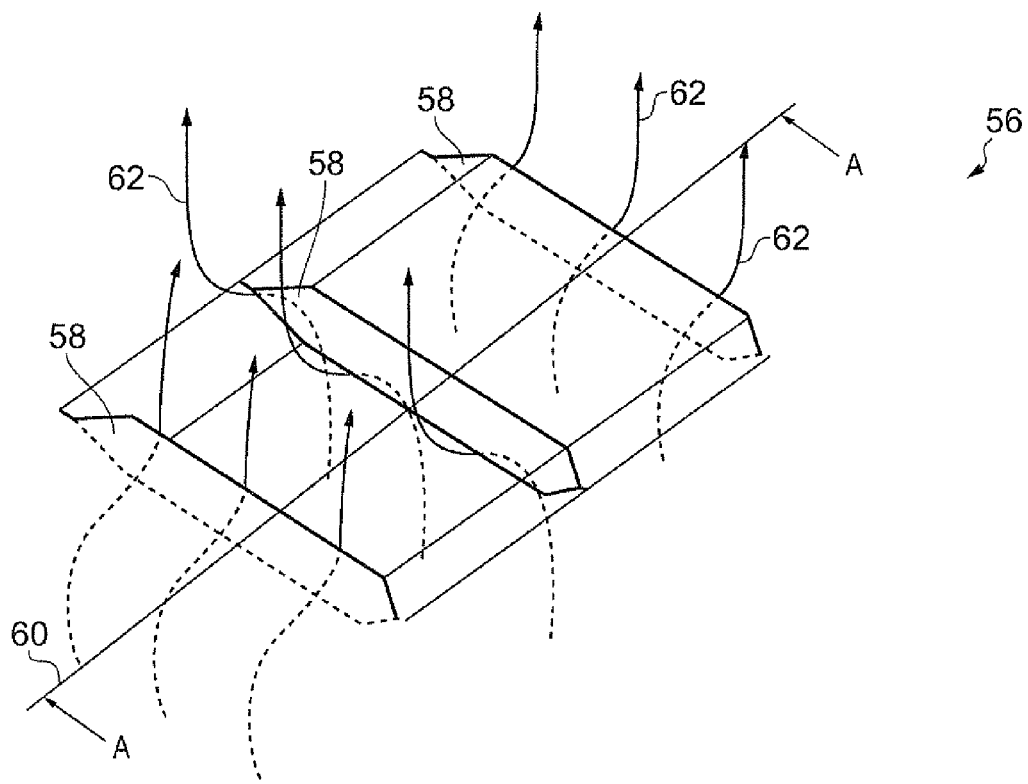
FIGS. 5a and 5b show a portion of a radiation screen from perspective views and a cross section.
Figure 5B:
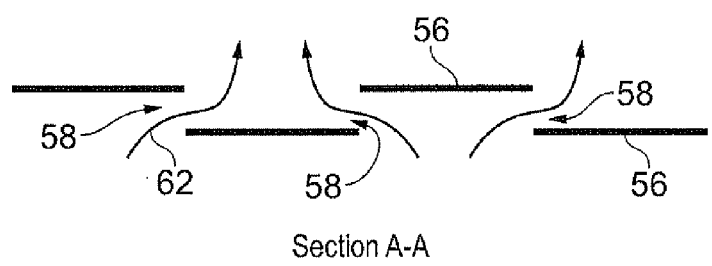

FIGS. 5a and 5b show a portion of the radiation shield 56 having the apertures 58 (FIG. 4) to allow a flow of coolant to pass from one side of the shield to the other and provide the increased cooling. In the described embodiment, there is provided a linear array of apertures which are distributed along an axis 60 which extends circumferentially around the shield 56. Hence, although only a few of the apertures 58 are shown, the apertures 58 will be continuously and evenly distributed around the circumference of the shield. As indicated in FIG. 4, the apertures are placed towards the opposite end of the shield relative to the coolant inlet and outlet so as to provide a fluid path which extends along the axial length of the machine.

To form the apertures 58, the shield 56 is provided with a plurality of axially extending, circumferentially distributed slits of similar length placed at regular intervals around the circumference of the shield. The slits define segments or portions of the shield which are subsequently displaced alternately in to and out of the surface of the shield so as to give a castellated band around the shield as indicated in FIG. 5*b* which shows the cross-section AA along axis 60. Thus, the shield has pressed or punched portions which are out of plane and which are integrally formed with the shield. By integrally formed, it will be understood that this includes any situation where the shield is deformed in some way to provide the shield, rather than by having a separate cover adhered, affixed or attached to the shield.

In use, coolant is provided to the space within the radiation shield and circulated through the openings 56 as indicated by arrows 62 in the drawings.

With the above embodiment, the apertures which are provided are tangential with reference to the circumference of the shield and do not have a radially exposed portion. Hence, the apertures are shielded from thermal radiation which is emitted towards the inner rotor from the outer rotor. This is beneficial as it allows the shield to provide protection from thermal radiation during use, whilst allow a subsequent path for coolant flow.

In another embodiment, the covers may be provided by having openings in the shield and placing a separate cover over each one so as to provide the tangential openings. In this embodiment, the covers would not be integrally formed but affixed or attached to the shield. The covers could be larger than the inner openings in the shield to further reduce any radiated heat passing through the apertures.

The superconducting machine may be part of a marine propulsion system. A major impediment to the adoption of superconducting machines in such propulsion systems is the long delay while cool-down proceeds before superconducting motors can be started. The present invention may also be applied to superconducting machines used in other environments, for example for aircraft propulsion.

The invention claimed is:

1. A superconducting rotary electrical machine, comprising:
   a two-part rotor having an inner rotor and an outer rotor configured to receive a flow of coolant, the inner rotor including at least one superconducting component requiring cooling for its operation; and
   a cooling system configurable to provide coolant to the two-part rotor in a first mode and a second mode,
   wherein during the first mode the cooling system is configured to provide coolant to the inner rotor and the outer rotor, and during the second mode the cooling system is configured to provide coolant to the inner rotor only such that the heat transfer from the superconducting component is higher in the first mode than in the second mode,
   wherein the outer rotor is a vacuum chamber configured to be under vacuum during operation of the cooling system in the second mode, the vacuum chamber further comprises a radiation screen which partitions so as to provide an inner region and an outer region, the inner and outer regions providing fluid paths for a flow of coolant,
   the inner region and the outer region being in fluid communication via an opening in the radiation screen which is located to provide a fluid path which extends along the axial length of the inner region, through the opening to the outer region or vice versa, the opening including a cover portion which substantially obstructs the opening from a generally radial direction.

2. A superconducting rotary electrical machine according to claim 1, in which the cooling system is adapted to change between the first and second modes by changing the total flow rate of the coolant.

3. A superconducting rotary electrical machine as claimed in claim 1, wherein the inner rotor includes a rotary shaft having a chamber for receiving a flow of coolant in the first mode.

4. A superconducting rotary electrical machine as claimed in claim 1, wherein the cover portion is integrally formed with the radiation screen.

* * * * *